United States Patent [19]

Mizone et al.

[11] Patent Number: 4,753,969
[45] Date of Patent: Jun. 28, 1988

[54] DIAPHRAGM FOR ELECTROACOUSTIC TRANSDUCER

[75] Inventors: Shinya Mizone, Osaka; Tamotsu Abe, Kyoto; Minoru Adachi, Ikoma; Takashi Kizawa, Kyoto, all of Japan

[73] Assignee: Onkyo Kabushikikaisha, Osaka, Japan

[21] Appl. No.: 756,290

[22] Filed: Jul. 18, 1985

[51] Int. Cl.$^4$ .................................................. C08K 9/10
[52] U.S. Cl. ................................... 523/211; 181/169; 428/408; 523/440; 523/466; 523/468
[58] Field of Search ............... 523/211, 440, 466, 468; 181/169; 428/408

[56] References Cited

U.S. PATENT DOCUMENTS 4,443,567  4/1984  Sternisa et al. ..................... 523/211
4,552,243 11/1985  Melillo et al. ........................ 428/902
4,626,466 12/1986  Schmidt et al. ...................... 428/282

FOREIGN PATENT DOCUMENTS 0191712 11/1983  Japan .

Primary Examiner—James J. Bell
Attorney, Agent, or Firm—John J. Byrne; Bradford E. Kile

[57] ABSTRACT

A diaphragm for an electroacoustic transducer comprising stratiform mineral of layers into which a hardener or an agent for facilitating hardening is adsorbed between the layers, thermosetting resin monomer, and carbonfibers which constitute a composite material which is formed under heat and pressure. The diaphragm is increased in rigidity which is required as physical properties therefor and is easy in forming.

6 Claims, 1 Drawing Sheet

DIAPHRAGM FOR ELECTROACOUSTIC TRANSDUCER

BACKGROUND OF THE INVENTION

This invention relates to a diaphragm for an electroacoustic transducer which is adapted for those such as speakers, microphones and the like.

Recently, it is proposed to use carbonfiber as a material for composing a diaphragm for an electroacoustic transducer which is, for example, adapted for speakers. The carbonfiber is used in order to increase rigidity of the diaphragm. Diaphragms, which are actually used prior to this invention, may be exemplified as follows.

(1) The diaphragms produced by the steps of mixing carbonfibers and pulpfibers to form a shape of a diaphragm, impregnating the formed diaphragm with thermosetting resins, and thereafter pressing same under heat.

(2) The diaphragms produced by the steps of mixing thermoplastic resins such as polyplopylene with carbonfibers to form a sheet, and then forming the sheet into a shape of a diaphragm by vacuum forming or molding the mixed material to be the diaphargm by injection.

(3) The diaphragms produced by the steps of impregnating a cloth of carbonfiber with thermosetting resins to be prepreg and pressing same into a shape of a diaphragm.

The above-mentioned diaphragms in the prior art, however, have the following drawbacks.

In the case of Item (1) above, the chracteristics of high elasticity as carbonfiber is not utilized sufficiently and the mixed or composite material including 50 weight percents of the carbonfibers indicates Young's modulus of at most $5 \times 10^{10}$ dyn/cm$^2$. Because, Young's modulus has a peak value with respect to the mixing ratio of the carbonfibers and pulpfibers and therefore even if the mixing amount of the carbonfibers is increased, it does not contribute to increasing of Young's modulus but rather brings about decreasing of Young's modulus.

In the case of Item (2) above, the mixing amount of the carbonfibers is limitted due to the size of an injection nozzle and fluidity of the mixture when it is formed into a sheet. For example, in the case of a sheet having thickness of 0.3–0.5 mm, the mixing ratio of the carbonfibers becomes 20 weight percents at the most.

Moreover, the mixing amount of the carbonfibers is further limitted in consideration of manufacturing processes of vaccum forming.

On the other hand, in the case of injection molding, the mixing amount of the carbonfibers becomes 15 weight percents in consideration of fluidity of the mixture. Therefore, it cannot increase rigidity of the diaphragm in the case of Item (2) above.

In the case of Item (3) above, rigidity of the diaphragm may be increased greatly in comparison with Item (2), but it is difficult to form a conical or dome shape from a plane cloth which is woven. Because, carbonfiber originally provides elasticity a little and only texture slippages have to be utilized when a plane cloth is formed into a solid shape such as conical and dome shapes. However, such texture slippages are very small once it has been woven as a cloth. Thus, it is necessary to utilize the texture slippages when forming the diaphragm of conical or dome shape and to this end, a number of processes including preforming are necessary. As the result, manufacturing cost becomes very expensive and further it is difficult to form a deep cone diaphragm or a cone diaphragm of complex shape having ribs at the intermediate portion thereof to form corrugation.

SUMMARY OF THE INVENTION

In view of the foregoing, an object of this invention is to provide a diaphragm for an electroacoustic transducer which is very easy in forming and particularly provides high rigidity.

To achieve the above object, the diaphragm of the electroacoustic transducer according to this invention has essential materials which comprise a stratiform mineral adsorbing between the stratum thereof, a hardner or an agent for facilitating hardening, thermosetting resin monomer and carbonfiber and then formed by mixing each of the said materials evenly and heating and pressing the composite material.

As the stratiform mineral adsobing between the stratum thereof a hardener or an agent for facilitating hardening, there is for example montmorillonite ($Al_2O_3.4SiO_2.nH_2O$; so-called "bentonite") as a kind of aluminium silicates. It is possible to adsorb a hardener or an agent for facilitating hardening between the aluminium silicate stratum of the montmorillonite by dipping at a temperature of 60° C., the montomorillonite in a solution obtained by solving the hardner or the agent after washing the solution so that the montomorillonite may be obtained as a composite material with the hardner or the agent for facilitating hardening.

Another object of this invention is to improve brittleness and impact resistance of the diaphragm.

A further object of this invention is to provide a diaphragm which provides high precision in size and no pinholes or deformation from the following description.

BRIEF DESCRIPTION OF THE DRAWINGS

The drawings show an embodiment of a diaphragm for an electroacoustic transducer according to this invention in which.

DETAILED DESCRIPTION OF THE PREFERRED EMBODIMENT

Figure 1:
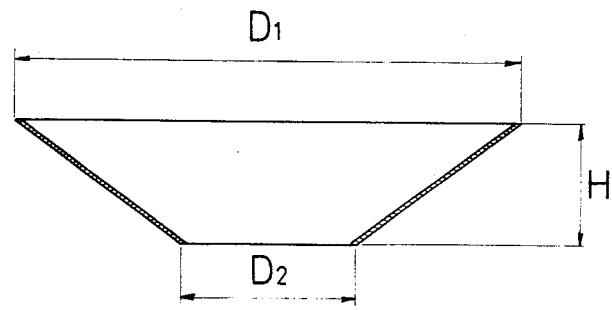
FIG. 1 is a brief sectional view of the diaphragm.

To illustrate this invention, five embodiments will be described through the following examples but it should, however, be understood that this invention is not limited to the specific embodiments only.

EXAMPLE 1

Complex (diaminodiphenylmethane is adsorbed as a hardener): 10 parts

Epoxy resin monomer (Tradename "ARALDITE 6071"): 35 parts

Hardner (diaminodiphenylsulfon): 4.4 parts

Mold releasing agent (zinc sterate): 1 parts

Carbonfiber (polyacrylonitrile carbonfiber (fiber length on the adverage: 0.35 mm): 50 parts The above materials are agitated at the temperature of 85° C. to be mixed evenly and thereafter cooled and pulverized into a composite material of powder. Then, the composite material is pressed and formed in dies having a predetermined shape at a temperature of 160°

C. under a pressure of 50 kg/cm² for 10 minutes so as to obtain a conical diaphragm (A) which has an opening or mouth diameter (D1) of 85 mm, a tip diameter (D2) of 30 mm, and a height (H) of 19 mm.

EXAMPLE 2

Complex (diaminodiphenylmethane is absorbed as a hardener): 8 parts
Epoxy resin monomer (Tradename "ARALDITE 6071"): 29 parts
Hardner (diaminodiphenylsulfon): 4.2 parts
Mold releasing agent (zinc sterate): 1 parts
Carbonfiber (polyacrylonitrile carbonfiber; fiber length on the average: 0.35 mm): 60 parts The above composite materials are formed into a conical diaphragm (B) of the same size as that of Example 1 by means of the same manner or process as Example 1.

EXAMPLE 3

Complex (ethylmethyl imidazole is adsorbed as agent for facilitating hardening): 6 parts
Epoxy resin monomer (Tradename "ARALDITE 6071"): 35 parts
Hardner (phthalic anhydride): 7 parts
Molding releasing agent (zinc sterate): 1 parts
Carbonfiber (polyacrylonitrile carbonfiber (fiber length on the average: 0.35 mm): 50 parts The above composite materials are formed into a conical diaphragm (C) of the same size as that of Example 1 by means of the same manner or process as Examples 1 and 2.

EXAMPLE 4

As one of inorganic scale materials, graphite fine powders (1325 mesh) of 10 parts are mixed with a composite materials which consist of the same compositions with the same composing ratios as Example 1, and thereafter the composite materials are pressed and formed into a conical diaphragm (D) of the same sizes as Example 1 by means of dies of predetermined shapes at a temperature of 160° C. under a pressure of 85 kg/cm² for 10 minutes.

EXAMPLE 5

Complex (diaminodiphnylmethane is adsorbed as a hardener): 10 parts
Epoxy resin monomer (Tradename "ARALDITE 6071"): 30 parts
Hardner (diaminodiphenylsulfon): 4.4 parts
Mold releasing agent (zinc sterate): 1 part
Carbonfiber (polyacrylonitrile carbonfiber (fiber length on the average: 0.35 mm): 45 parts The powder composite materials are obtained by agitating the above composite materials to mix them evenly at a temperature of 85° C. and thereafter cooling and pulverizing same.

Next, 10 weight parts of silicon carbite whisker (its fiber diameter is 0.2–0.5 μm) as an example of whiskers are evenly mixed with the above composite materials and thereafter the mixture is formed into a conical diaphragm (E) in the same size as Example 1, by pressing and heating the mixture by means of dies of predetermined shapes at a temperature of 160° C. under a pressure of 85 kg/cm² for 10 minutes.

Now, two examples of the prior art will be described in order to compare same with each of the above mentioned examples in respect of physical properties thereof.

PRIOR ART 1

A diaphragm Z formed by heating and pressing a composite materials which consist of 50 weight parts of kraft pulp, 35 weight parts of carbonfiber, and 15 weight parts of phenolic resin.

PRIOR ART 2

A diaphragm Y formed by injection molding of a composite materials which are obtained by mixing 15 weight parts of the carbonfiber with polypropylene resins evenly. The physical properties (density ρ and Young's modulus E) of the above five examples and the two examples of the prior art are measured and the results are as shown in Table 1.

TABLE 1

| | | P.P. | |
|---|---|---|---|
| | $\rho$ (g/cm³) | E ($\times 10^{10}$ dyn/cm²) | E/$\rho$ ($\times 10^{10}$ dyn cm/g) |
| A | 1.55 | 14.6 | 9.4 |
| B | 1.62 | 18.0 | 11.1 |
| C | 1.54 | 14.3 | 9.3 |
| D | 1.58 | 15.0 | 9.5 |
| E | 1.58 | 14.8 | 9.4 |
| Z | 0.7 | 2.5 | 3.6 |
| Y | 1.02 | 6.1 | 6.0 |

As will be seen from Table 1, it is understood that the diaphragm of each of the examples according to this invention is very high in the ratio of density ρ to Young's modulus S, comprising with those in the prior art.

The reason for greatly raising Young's modulus of the diaphragm in each of the examples may be understood as follows.

The montmorillonite epoxy complex is disposed to fill up gaps in carbonfiber, carbonfibers and whiskers, or carbonfibers and graphite fine powders. The blend-type polymer is formed from a polymer in which the epoxy polymer and the montmorillonite are strongly bonded to each other, said polymer being located between the stratum of the montmorillonite. Then, the blend-type polymer is formed into a three-dimensional netting structure so as to entangle and involve the carbonfibers, carbonfiber and whiskers, or the carbonfiber and the graphite fine powder.

In each of the examples, the epoxy resin is once molten to have low viscosity and is liquid or flowed. However the epoxy resin keeps its liquidity with low viscosity at the specified temperature lower than 150° since the hardener or the agent for facilitating harding, which is absorbed between the stratum of the montmorillonite, should not melt out. As the result, it becomes possible to grade up precision in both of shape and size and injection molding becomes possible since the time for carrying out hardening is relatively long.

Particularly, as shown in Example 4, it becomes possible to surely stop separation of the resin from a filler.

Further, in the case of Example 4, the fine powder of graphite flows together with flowing resin and functions to flow the carbonfibers. Therefore, it becomes possible to surely prevent separation of the resin from the filler when molding. As the result, it makes occurence of pinholes and deformation of the diaphragm minimum through molding and then the diaphragm is made to have homogeneous and precision in size.

The following is the experimental result of the above Example 4. To confirm the particular advantages of the above Example 4, it is made an experiment therewith and the following is the result.

Test Pieces (1) The diaphragm (D) as shown in the above Example 4

(2) The diaphragm (A) as shown in the above Example 1

Gist of Experiment

The above diaphragms (D) and (A) are used 100 pieces respectively and occurences of pinholes and deformation are checked.

The results are as shown in the next Table 2.

TABLE 2

| Test piece | Number of pinholes per a piece of diaphragm | Number of deformed sheet |
|---|---|---|
| D | 31 | 21 |
| A | 0.21 | 3 |

As will be seen from Table 2, the diaphragm as shown in Example 4 has good advantages in mass-production since it is extremely a little to occur pinholes and deformation.

Figure 2:
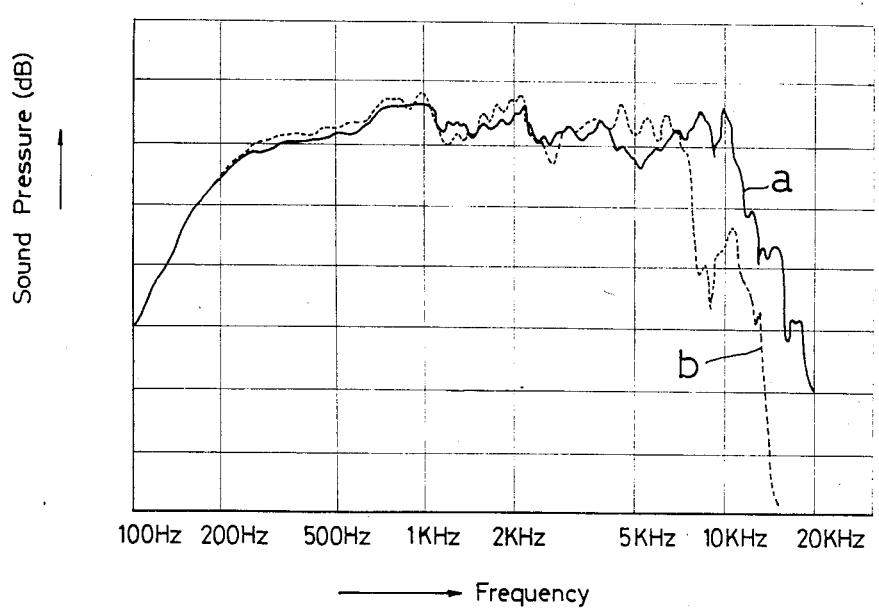
FIG. 2 is a graph showing frequency chracteristics of two speakers each having a diaphragm of prior art and a diaphragm of this invention.

Further, as illustrated in FIG. 2, the speaker provided with the diaphragm (A) obtained according to Example 1, and the speaker provided with the diaphragm (Y) obtained according to the prior art, are examined in respect of their frequency characteristics. The frequency characteristics (a) of the former speaker has tendency of sound pressure which is reduced a little in comparison with the frequency characteristics shown by (b) of the latter speaker, but the high frequency range of the sound reproduction is greatly improved and in view of this point superiority as a diaphragm is demonstrated.

Next, other embodiments of this invention will be described and these embodiments are based on each of the above Examples 1-5. The diaphragms shown in the Examples are further improved in connection with brittleness and impact resistance.

EXAMPLE 6

Complex (Diaminodiphnylmethane is absorbed as a hardener): 4 parts
Epoxy resin monomer (Tradename "ARALDITE 6071"): 34 parts
Graphite: 17 parts
Milled carbonfiber (fiber length on the average: 0.31 mm): 41 parts The above materials are agitated at a temperature of 85° C. and mixed evenly and then cooled and pulverize into a composite material of fine powder.

Next, with the above composite material, 4 parts of chopped carbonfibers (fiber length on the average 3 mm) are mixed and formed to obtain a diaphragm (G) by means of dies of predetermined shapes at a temperature of 160° C. under a pressure of 50 kg/cm² for 10 minutes.

EXAMPLE 7

Complex (Diaminodiphnylmethane is adsrobed as a hardener): 4 parts
Epoxy resin monomer (Tradename "ARALDITE 6071"): 34 parts
Graphite: 17 parts
Milled carbonfiber (fiber lenth on the average: 0.30 mm): 37 parts The above materials are agitated and mixed evenly and thereafter cooled and pulvalized into a composite material of powder.

Next, with the composite material, 8 parts of chopped carbonfibers (fiber length on the average: 3 mm) are mixed and formed to obtain a diaphragm (H) by means of dies of predetermined shapes at a temperature of 160° C. under a pressure of 50 kg/cm² for 10 minutes.

EXAMPLE 8

Complex (Diaminodiphnylmethane is adsorbed as a hardener): 4 parts
Epoxy resin monomer (Tradename "ARALDITE 6071"): 34 parts
Graphite: 17 parts
Milled carbonfiber (fiber length on the average: 0.30 mm): 33 parts The above materials are agitated and mixed evenly and thereafter cooled and pulverized into a composite material of powder.

Next, 12 parts of chopped carbonfibers are added to and mixed with the above composite material and then formed to obtain a diaphragm (I) by means of dies of predetermined shapes at a temperature of 160° C. under a pressure of 50 kg/cm² for 10 minutes.

Now, Comparative Examples will be described below in order to compare same with each of the above Examples 6, 7 and 8.

COMPARATIVE EXAMPLE 1

Complex (Diaminodiphnylmethane is adsrobed as a hardener): 4 parts
Epoxy resin monomer (Tradename "ARALDITE 6071"): 34 parts
Graphite: 17 parts
Milled carbonfiber (fiber length on the average: 0.30 mm): 45 parts The above materials are all agitated and mixed and thereafter cooled and pulverized into a composite material of powder.

Next, the composite material is formed to obtain a diaphragm (X) by means of dies of predetermined shapes at a temperature of 160° C. under a pressure of 50 kg/cm² for 10 minutes.

Each of the diaphragms obtained by the above Examples 6, 7 and 8 and that obtained by the Comparative Example 1 are compared with one another with respect to flexural strength and the results are as shown in the following Table 3.

TABLE 3

|  | G | H | I | X |
|---|---|---|---|---|
| Flexural strength kg/mm² | 7.6 | 7.7 | 8.4 | 5.5 |

Further, from the mateials obtained by each of the above Examples 6, 7 and 8 and that obtained by the Comparative Example, a disc having a diameter of 50 mm, thickness of 0.8 mm is formed respectively. Onto the disc, a steel ball having a diameter of 15 mm and its weight of 16.3 g is fallen and each of the falling distances, which cause the discs to be torn, are measured and the results are as shown in Table 4.

TABLE 4

|  | G | H | I | X |
|---|---|---|---|---|
| Falling distance (cm) | 80 | 90 | 100 | 60 |

The above Tables 3 and 4 make it clear that it is obtained a diaphragm for an electroacoustic transducer which is superior to brittleness and impact resistance which result in increasing of high flexural strength by using short carbonfibers having its fiber length of about 30–1000 μm and long carbonfibers having its fiber length of about 3–8 mm, which comprise, in combination, a main material in this invention.

Next, a further embodiment of this invention will be described but this embodiment is also based on each of the above Examples 1 to 5. The diaphragm disclosed in this embodiment is superior to those of the Comparative Example 2, which is one of the basic embodiments of this invention, with respect to not only brittleness and impact resistance but also flexural strength and increasing of internal loss, all of which may improve sound chracteristics.

EXAMPLE 9

Complex (diaminodiphnylmethane is adsorbed as a hardener): 11 parts
Epoxy resin monomer (Tradename "ARALDITE 6071"): 40 parts
Hardener (Diaminodiphnylsulfon): 4.5 parts
Molding releasing agent (zinc sterate): 1 part
Carbonfiber (polyacrylonitrile carbonfiber (fiber length on the average: 0.2 mm): 43.5 parts The above materials are all agitated and mixed evenly at a temperature of 85° C. and thereafter cooled and pulverized into a composite material of powder. On the other hand, NUKP and resolved pulp are mixed at a weight ratio of 8 to 2 and the mixture is beaten until it reaches 500–600 freeness.

Next, the beaten pulp fibers are formed into a shape of diaphragm shape and then dried by means of an airdryer so as to obtain a fiber-layer in the shape of a diaphragm. This fiber-layer is put in a die having a concave which is substantially the same shape as that of a diaphragm and then a predetermined amount of the composite material of powder is put on the fiber-layer to have a constant thickness and then another die of convex engagable with the concave die is set and then press forming is carried out at a temperature of 150° C. under a pressure of 100 kg/cm² for 5 minutes and then the layer obtained by the composite material and said fiber-layer are integrally laminated or stratified by epoxy resin flowing into the said fiber-layer surfaces and accordingly a laminated or stratified diaphragm (J) is obtained.

COMPARATIVE EXAMPLE 2

By using only the composite material of powder shown in the above Example 8, a diaphragm (W) is obtained by pressing the said composite material under the same conditions as the above Example 8.

The diaphragms (J) and (W), each being obtained according to the above Example 8 and the Comparative Example 2, are measured in respect of physical properties and the results are as shown in the following Table 5.

TABLE 5

| Characteristics | J | W |
|---|---|---|
| Young's modulus ($\times 10^{10}$ dyn/cm²) | 9.0 | 14.8 |
| Density ρ (g/cm³) | 1.08 | 1.58 |
| Internal loss (tan · δ) | 0.022 | 0.015 |
| Thickness (cm) | 0.07 | 0.048 |
| Flexural rigidity | 3.09 | 1.62 |

To compare the diaphragms (J) and (W) obtained according to the above Example 8 and the comparative Example 2 in respect of impact resistance, a steel ball of 16.5 kg, is folen thereon and the falling distances, which casue the diaphragms broken, are measured and the results are as shown in the following Table 6.

TABLE 6

|  | J | W |
|---|---|---|
| Falling distance (cm) | 126 | 60 |

It is clarified from the above Tables 5 and 6 that it is possible to obtain a diaphragm for an electroacoustic transducer which is superior in sound chracteristics since it may increase not only brittleness and impact resistance but also flexural strength and internal loss by laminating or stratifying the layer formed from the composite material and the fiber-layers in this invention.

In this embodiment, as laminating or stratifying means for both of the layers, as described hereinbefore, it is utilized epoxy resin flowed in the dies into the fiber-layer surfaces so that both of the layers may be laminated or stratified integrally and strongly with one another wihtout use of a particular adhesive agent.

The following is the description in connection with the essential materials used in this invention.

As the scale material, fine mica powders may be used other than graphite powders.

As whisker, it may be used titanic acid potassium, nitril silicon whisker, and alumina whisker independently or in combination other than silicon carbite whisker.

As the agent for facilitating hardening which is adsorbed into the mineral in the form of layers, it may be used for example ethylmethyl imidazole in combination with phthalic anhydride (hardener).

It is preferable to use the amount of the mixture of carbonfibers in the range of 30–60 parts in consideration of degree of reinfocement or liquidity of the resin.

Further, it is preferable to use chopped carbonfibers used in Examples 6 and 7 in the mixing range more than 2 parts but less than about 15 parts.

Morefurther, the diaphragm adapted for this invention is not limited to cone type diaphragms but applicable to dome type and center-dome radiator diaphragms or dust caps.

What is claimed is:
1. A diaphragm for an electroacoustic transducer formed from a composite comprising:
   carbon fibers;
   a thermosetting epoxy resin polymer;
   a hardener for facilitating hardening of the epoxy resin polymer;
   montmorilonite which absorbs said hardener;
   said materials being combined to form said composite for forming into a diaphragm under heat and pressure.

2. A diaphragm for an electroacoustic transducer as claimed in claim 1 further comprising whisker, said whisker being mixed with the same composite material and formed into the diaphragm under heat and pressure.

3. A diaphragm for an electroacoustic transducer as claimed in claim 2 wherein said whisker is constituted by at least one selected from a group of silicon carbite whisker, titanium acid potassium whisker, nitrile silicon whisker and alumina whisker.

4. A diaphragm for an electroacoustic transducer as recited in claim 1, wherein said carbonfibers include long and short carbonfibers.

5. A diaphragm for an electroacoustic transducer as recited in claim 4 wherein said short carbonfibers having a length of 30–1000 $\mu$m and said long carbonfibers having a length of 3–8 mm.

6. A diaphragm for an electroacoustic transducer as defined in claim 1 and further comprising:
   a scaly material, mixed with said composite prior to forming into the diaphragm under heat and pressure.

* * * * *